No. 813,596. PATENTED FEB. 27, 1906.
J. H. STEPHENSMEIER.
HORSESHOE.
APPLICATION FILED AUG. 23, 1905.

WITNESSES:

INVENTOR
John H Stephensmeier
BY Geo. H. Bates
Attorney

UNITED STATES PATENT OFFICE.

JOHN H. STEPHENSMEIER, OF ST. LOUIS, MISSOURI.

HORSESHOE.

No. 813,596.  Specification of Letters Patent.  Patented Feb. 27, 1906.

Application filed August 23, 1905. Serial No. 275,374.

*To all whom it may concern:*

Be it known that I, JOHN H. STEPHENSMEIER, a citizen of the United States, residing at St. Louis, in the State of Missouri, have invented new and useful Improvements in Horseshoes, of which the following is a specification.

My invention relates to improvements in horseshoes wherewith is associated a hoof-protecting plate, whereby the bottom of the animal's hoof is saved from injury from stones, puncture by nails, and other foreign substances. It is obvious that the improvements may be applied to shoes of the common variety and with equal adaptation to the hoofs of either horses or mules.

The novelty will be specified in the description and be particularly pointed out and distinctly asserted in the claims.

I have fully and clearly illustrated my invention in the accompanying drawings, to be taken as a part of this specification.

Figure 1:
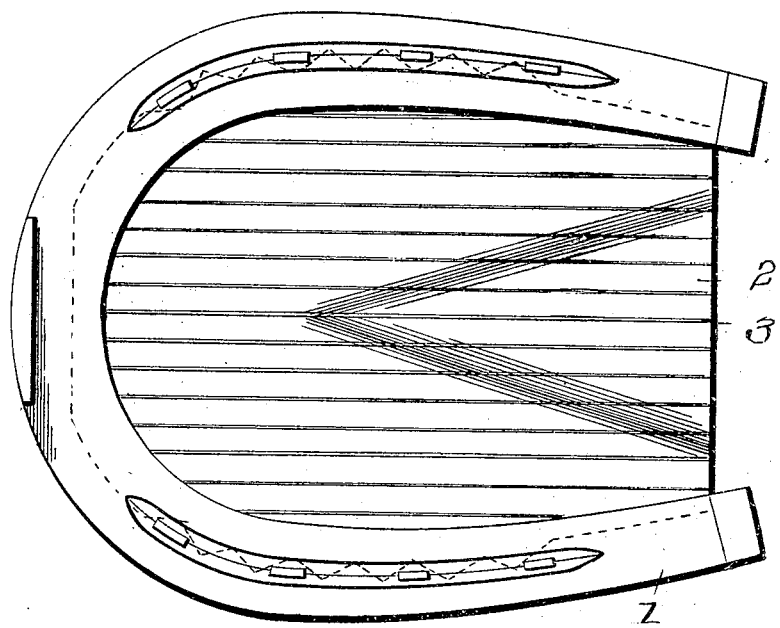
Figure 2:
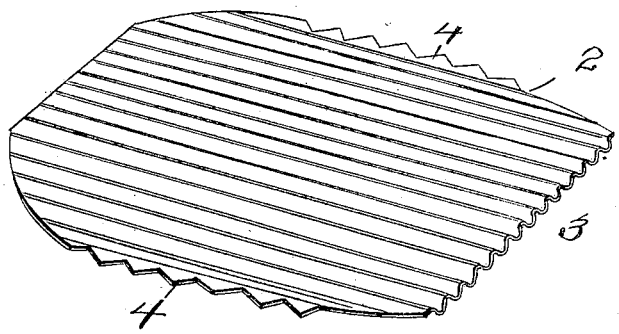
Figure 3:
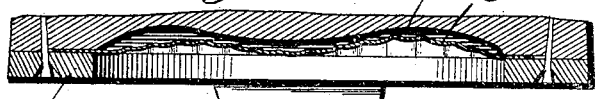

Reference being had to the drawings, Figure 1 is a bottom plan view of the improvements as applied with the shoe to an animal's hoof, indicating by dotted lines the position the protecting-plate occupies under the shoe. Fig. 2 is a perspective view of the protecting-plate. Fig. 3 is a transverse section through the hoof, plate, and the shoe, showing the cross-section contour the plate assumes when in position.

In the drawings similar parts appearing in different figures are designated by the same reference notation.

Reference being made to the drawings, 1 designates the shoe, which may be made of any of the modern styles, being provided with the usual toe and heel calks and having countersunk channels wherein the nail-holes appear at determined spaces apart.

2 designates the protecting-plate, made of a steel or iron plate and corrugated longitudinally, as at 3, and is formed in edge contour to substantially conform to the shape of the hoof, substantially as shown in Fig. 2 of the drawings. In each edge of the plate 2 are made a series of notches 4, which when the plate is in position under the shoe straddle the fastening-nails and hold the plate from longitudinal displacement, as indicated in the dotted lines in Fig. 1 of the drawings. The rear end of the protecting-plate is cut square across, as shown, and extends far enough at the rear of the hoof to afford ample protection to the hoof at that particular portion. It will be seen that the protecting-plate covers the whole of the exposed surface of the hoof between the limbs of the shoe.

The application of the protecting-plate is apparent. It is well known that when the shoe is placed in position the bottom of the hoof is cut away for a distance, as indicated in Fig. 3 of the drawings, so that there is a space between the face of the hoof and the inner bearing portion of the shoe. Therefore all that is necessary to do to set the plate in position is to insert one edge thereof between the shoe and the hoof and then spring the other edge into the opposite space between the shoe and the hoof, and then if further adjustment of the plate is required it may be made by any means.

Having thus described my invention, what I claim, and desire to secure by Letters Patent, is—

1. A protecting-plate for a horse's hoof, consisting of a metal plate corrugated longitudinally and adapted to lie over the bottom of the hoof and cover the same and be positioned over the shoe.

2. A protecting-plate for a horse's hoof, consisting of a metal plate adapted to cover the bottom of the hoof, and corrugated longitudinally, and having notches in the side edges to straddle the shoe-nails when placed in position whereby the plate is held against longitudinal displacement.

In testimony whereof I affix my signature in presence of two subscribing witnesses.

JOHN H. STEPHENSMEIER.

Witnesses:
 BURR N. EDWARDS,
 BERNARD SPOHN.